United States Patent [19]
Lello et al.

[11] 4,114,915
[45] Sep. 19, 1978

[54] SKI CADDY

[76] Inventors: Diane L. Lello, 2517 Dunks Ferry Rd. Apt. A-309, Cornwell Heights, Pa. 19020; Barry S. Diamond, 1901 Warick Bldg. 3850 Woodhaven Rd., Philadelphia, Pa. 19154

[21] Appl. No.: 724,169
[22] Filed: Sep. 17, 1976
[51] Int. Cl.² .............................................. B62B 1/06
[52] U.S. Cl. ............................... 280/47.19; 224/45 S; 280/8; 280/11.37 R
[58] Field of Search ........... 280/47.19, 47.26, DIG. 3, 280/11.37 K, 11.37 R, 8; 224/45 S, 5 Z, 8 A, 25 A; 211/38

[56] References Cited
U.S. PATENT DOCUMENTS

| 3,046,031 | 7/1962 | Reynolds | 280/47.26 X |
| 3,413,012 | 11/1968 | Coffman | 280/47.19 |
| 3,794,226 | 2/1974 | Penniman | 224/45 S |
| 3,934,895 | 1/1976 | Fox | 280/DIG. 3 |

FOREIGN PATENT DOCUMENTS

| 898,864 | 9/1969 | Canada | 280/11.37 K |
| 1,552,202 | 11/1967 | France | 280/11.37 K |

Primary Examiner—John A. Pekar
Attorney, Agent, or Firm—Stuart E. Beck

[57] ABSTRACT

A device which can be used to transport ski boots, poles and skis over both snow and clear terrain. It comprises an elongated member which supports wheels, a member for sliding over snow, means for supporting ski boots and means for supporting poles and skis. The device is collapsible so that its size when not being used to carry skis is substantially less than when it is in its full extended configuration.

16 Claims, 4 Drawing Figures

SKI CADDY

DISCLOSURE

This invention relates to a caddy for skis, poles and ski boots, more particularly, to a device which can be used to carry these items over terrain which is clear, or which is covered with snow.

Over the last few years, a number of devices have become available for use by skiers in transporting their equipment. Typically, these devices have means for carrying both skis, ski poles, and on occasion, the ski boots. Often, these devices are quite bulky since they are usually at least as long as the skis themselves. Even though relatively small devices which can be connected by clamps to one end of a pair of skis have been employed, this latter type of device has been largely unsuccessful since it is relatively unstable. Thus, these devices are only about as wide as the skis. Thus, they have a high center of gravity when skis are connected to them and frequently will tip over.

On the other hand, devices which incorporate a structure for supporting the skis along their lengths, usually are so long that they cannot be readily transported.

A caddy which could be used to carry both skis and ski boots at the same time, and which could be collapsed to substantially reduce its size when it was being used to carry only ski boots has not been successfully developed heretofore. Such a caddy should advantageously be lightweight and of simple construction. Further, it should be capable of operating both on snow as well as clear terrain.

Substantial advantages can be achieved by use of a device of the type just described. Thus, the ski boots could be connected to the device and carried in the trunk of an automobile while the poles and skis themselves would be carried on the roof. When the skiing site would be reached, the device could be extended to its full length in order to carry the poles and the skis. Such a device would offer substantial advantages in that it would be useful for caddying the equipment over parking lots, snowy hillsides, walkways and the like, so that the person pulling the device would not have to carry it.

With the foregoing in mind, the invention, in one aspect, relates to a caddy comprising an elongated member which carries a plurality of wheels so that it can be transported over clear terrain and a snow support so that it can be transported over snow. Additionally, it includes means coupled to the elongated member for supporting at least one ski boot.

In another aspect, the invention relates generally to a caddy comprising an elongated member having at least one laterally extending member coupled thereto and means for supporting at least one ski boot coupled to said elongated member and said laterally extending member.

For the purpose of illustrating the invention, there is shown on the drawing forms which are presently preferred, it being understood, however, that this invention is not limited to the precise arrangement and instrumentalities shown, and wherein.

Figure 1:
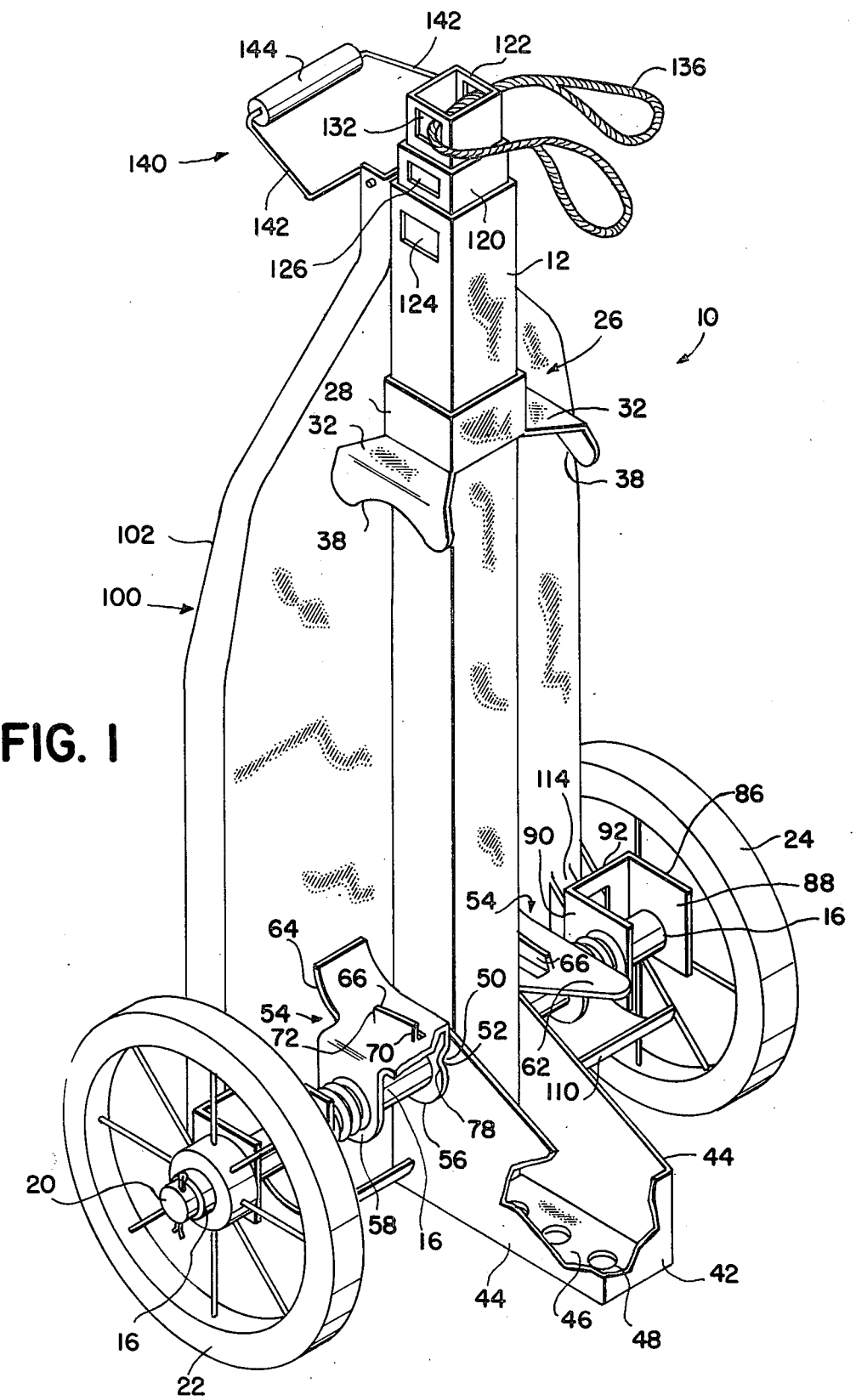
FIG. 1 is a front perspective view of the caddy disclosed herein.
Figures 2, 3, 4:
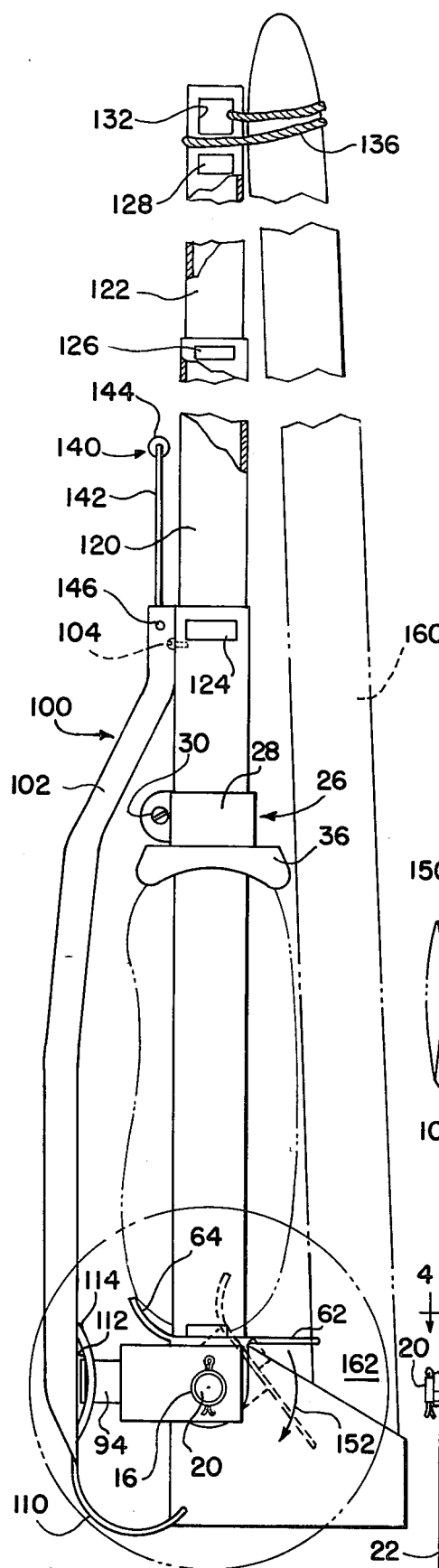
FIG. 2 is a left side elevation view of the caddy shown in FIG. 1 in extended configuration.
FIG. 3 is a front elevation view of the caddy in its collapsed configuration.
FIG. 4 is a view taken along line 4—4 of FIG. 3.

Now referring to the drawing for a detailed description of the invention, in FIG. 1 the ski caddy 10 comprises a framework that includes an elongated rectangular hollow centrally disposed member 12 and a laterally extending shaft housing 16 supported thereon. Preferably the shaft housing 16 is an elongated cylindrical hollow element which extends through an aperture (not shown) at the lower end of the central member 12. A wheel shaft 20 which is rotatably received within the shaft housing 16 has two wheels 22 and 24 connected to its ends. The wheels may be retained on the shaft by cotter pins, such as shown in FIGS. 2 and 3, or speed nuts, or any other suitable fastening means.

The caddy comprises means for supporting a pair of ski boots. The support means comprises an upper support 26 which includes a collar 28 which is mounted so that it can be fixed in any convenient location on central member 12 by a suitable adjustable fastener such as screw and nut 30. The collar 28 supports two laterally extending flanges 32. Each laterally extending flange includes a downwardly directed lip 38 which is engagable with a portion of a ski boot in a manner which will be explained.

A generally upwardly facing cup member 42 comprising side walls 44 and bottom wall 46 is coupled to the lower end of central member 12. The bottom wall 46 comprises a plurality of apertures 48 through which water may drain.

The cup is slipped over the lower end of the central member 12 with side walls 44 in close contact with the side walls of the central member. The side walls 44 are provided with apertures (not shown) through which the shaft housing 16 can be inserted. Thus, the shaft housing 16 retains the cup member 42 on central member 12. Additionally, if desired, there could be further connection between the cup member 42 and central member 12 in the form of connection means between the bottom wall 46 and the central member.

As seen in FIGS. 1 and 3, a portion of each side wall 44 is cut at 50 and raised to provide a camming surface 52. The purpose of the camming surface will be explained below.

Immediately adjacent to the side walls 44 of the cup member 42 are the ski boot supporting members 54. The ski boot support members comprise two downwardly directed legs 56 and 58. Each leg has an aperture 59 so that members 54 are pivotally mounted on the shaft housing 16. The legs are interconnected by an web 60.

As best seen in FIGS. 1 and 2, web 60 comprises a forwardly extending portion 62 and a rearwardly and upwardly extending portion 64. The forwardly extending portion is flat and may be tapered as shown.

An elongated, upwardly directed gripper 66 having a bearing surface 68 for bearing engagement with a portion of a ski boot is provided on each web 60. The drawing illustrates the gripper being formed by cutting webs and then turning up the tab formed thereby. However, it is apparent that the grippers could be created in any convenient manner. It should be noted, however, that the grippers are preferably not straight. Thus, they are curved so that their ends 70 are closer to the central member 12 than their ends 72.

Additionally, it should be noted that each of the inner legs 56 comprises a camming surface 78 which is complementary with camming surfaces 52. When support member 54 is in the solid line position shown in FIG. 2, the two camming surfaces 52 and 78 are aligned and leg 56 lies along wall 44 and the distance between grippers 66 and the side of the central member 12 is slightly less than the thickness of the sole of the ski boot.

Immediately outward of support member 54 is a suitable resilient means such as helical compression spring 82. The spring bears against leg 58 and urges the support member 54 inwardly toward the central member. Outboard of the helical compression spring 82 is a generally "U" shaped bracket 86 which comprises legs 88 and 90 which are interconnected by a web 92. The web is cut on three adjoining sides to form a rearwardly and outwardly directed tab 94. The tabs function in a manner which will be explained.

The caddy also includes means for supporting it on snow. The snow support 100 may be formed from a sheet of lightweight metal such as aluminum which is relatively thin with respect to its width. Its lateral edges are turned rearwardly to provide runners 102. The snow support 100 is arranged so that it lies along central member 12. It is wide enough so that it extends substantially from wheel to wheel. This provides for good stability on snow and assures that the weight of the materials carried will be distributed over a large area. Its upper end may be tapered to the width of central member 12. It may be connected to that member by a suitable fastener such as a metal screw 104.

Additionally, the snow support protects the ski boots from the terrain. Thus, the boots could be damaged if they are pulled over stones or gravel or they could get wet. This is avoided since the snow support is relatively wide and thus protects them.

The lower end of the snow support is curved forwardly as at 110 to provide clearance for the wheels and also to provide a smooth surface for sliding over obstacles.

As best seen in FIGS. 3 and 4, suitable means are provided for connecting the lower portion of the snow support 100 with the shaft housing 16. This means comprises the aperture 112 between arcuately shaped members 114 and the snow support. Members 114 may be welded or soldered to the lower outboard portion of the wheel support so that they face forward as illustrated. However, it is preferred that these arcuately shaped members 114 be formed by making elongated closely spaced slits in the snow support and then deforming the metal between the slits.

The arcuately shaped members and the tabs 94 form complementary locking means which secure the lower portion of the snow support to the shaft housing. This is accomplished by displacing the "U" brackets 86 against the force of springs 82 until the tabs 94 are positioned to slide into apertures 112 under the arcuate members 114. When the "U" brackets are permitted to return to their normal positions under the force of springs 82, a secure connection between the brackets and the snow support is accomplished.

The central member 12 telescopically receives a plurality of elongated similarly shaped elements. As shown in the drawing, two additional elements, namely elements 120 and 122, are provided.

As seen in FIGS. 1 and 3, elements 120 and 122 can be readily received within the central member 12. They are normally constrained in the positions illustrated in FIGS. 1 and 3 by mutual engagement of locking means 124, 126, and 128 which are formed at the ends of the respective elements. The locking means merely comprise deep embossments in the opposite side walls of the members. Central member 12 only has an embossment 124 at its upper end. However, each of elements 120 and 122 comprise embossments at each of their ends (and only one of which is shown in each case). The embossments at the upper end of each of the elements 120 and 122 and member 12 retain the members within each other in their collapsed positions. On the other hand, when the embossments at the other ends of elements 120 and 122 are engaged with the embossments at the upper ends of member 12 and element 122 the members will be retained in their extended positions.

The upper end of element 122 is provided with an aperture 132 through which a suitable elongated flexible member 136 can be extended. Preferably, member 136 is an elastic cord or similar device.

The caddy also includes a handle 140 which comprises two bails 142 which are interconnected by a gripping portion 144. The bails are turned so that their distal ends 146 extend outwardly through complementary apertures at the upper portion of runner 102 thereby connecting the handle to the caddy.

In order to mount a ski boot 150 onto the caddy, the support member 54 is rotated in the direction of arrow 152 into the position shown in dotted lines. Rotation of member 54 in the direction of arrow 152 causes the cam surfaces to become operative to displace member 54 outwardly along the shaft housing 16 to thereby increase the distance between the gripper member 66 and the side wall of the central support member 12.

The heel portion 156 of the bottom of the boot is placed in engagement with downwardly facing lip 36 and the toe portion 158 is placed in engagement with the upper surface of web 60 and lies against the rear curved portion 64. The toe portion can fit easily between the gripper 66 and the central member 12, because gripper 66 has been cammed away from member 12. As the toe is pushed back against the rear curved portion 64 it will rotate back into the position shown in solid lines and the gripper 66 will come into contact with the toe portion 158. Firm engagement between the gripper member and the toe portion will be achieved since at this point the camming surfaces 56 and 78 will align and end 70 will bear against the toe portion under the force of spring 82.

In order to release the ski boot, all that need be done is to press down on forwardly extending portion 62 on member 54 so that it is rotated into the position shown in dotted lines. This will simultaneously rotate the toe of the ski boot forward and also release the pressure exerted by end 70. This will enable the ski boot to be easily removed from the caddy.

With the ski boots 150 mounted securely on the caddy as shown in FIGS. 2 and 3, the telescoping elements 120 aand 122 can be slipped within the central member 12 and the caddy can then be placed in the trunk of a car or, can be carried conveniently from place to place by handle 140.

If, on the other hand, skis are also to be transported then the telescoping elements 120 and 122 are extended to their full length as illustrated in FIG. 2. Skis 160 are mounted on the caddy so that their heels 162 are disposed in cup 42 and their toes lie along the upper portion of element 122. The elongated flexible member 136 can then be wrapped securely around the toes of the skis.

It is then a simple matter to pull the ski caddy along the ground by holding on to the upper end of element 120. In those areas where the terrain is clear the caddy will roll. However, where there is snow on the ground the snow support 100 will support the caddy. It should be appreciated that runners 102 will prevent lateral shifting of the caddy as it is pulled along a snowy slope.

In order to remove the skis, member 136 merely needs to be untied and the skis are readily released.

The ski caddy can be made from any convenient non-rusting materials, preferably, it is made of aluminum and the wheels are of hard rubber or plastic. It is contemplated that the completed device will probably weigh no more than 5 or 7 pounds, thus providing a lightweight inexpensive caddy which can be easily handled by both young people and adults. Also, while the snow support is connected to the rest of the caddy by only one screw and the tabs, it is apparent that it could be permanently connected by being welded or soldered. Further, it should be appreciated that the disclosed invention has utility as a ski boot caddy alone. In this regard, if cup member 42 is not used, the cut 50 and camming surface 52 on side walls 44 could be relocated on the sidewall of central member 12.

While the invention has been described with respect to certain forms and embodiments thereof, it is apparent that many other forms and embodiments will be obvious to those skilled in the art in view of the foregoing description. Thus, the scope of the claim should not be limited by the description but, rather, only by the scope of the claims appended hereto.

I claim:

1. A caddy comprising a framework; said framework including an elongated member, said elongated member comprising a plurality of telescopically interconnected elements which are slidably interconnected to each other, and means for retaining said elements in their extended position; a plurality of wheels, said framework including means for rotatably mounting said wheels in spaced relation to each other to one end of said elongated member to enable said caddy to roll over a clear terrain, means connected to said framework for supporting at least one ski boot; a snow support, means for connecting said snow support to said framework so that it lies adjacent to said wheels, said wheels and said snow support being proportioned so that said caddy is supported by said wheels in shallow snow and by said snow support in deep snow; a cup, said cup being connected to one end of said elongated member with its opening in generally facing relation to said interconnected elements so that the heels of skis which are carried thereby are supported by said cup as they lie along the interconnected elements when they are extended.

2. A device as defined in claim 1 including means for supporting another ski boot, and said means for supporting said ski boots are disposed on opposite sides of said elongated member.

3. A device as defined in claim 1 including a handle for said caddy, said handle including two bails connected by a grip, and means for connecting said bails to said caddy.

4. A caddy comprising a framework that includes an elongated member and oppositely directed laterally extending members supported by said elongated member; a plurality of wheels; means connected to said framework for supporting said wheels on opposite sides of and at one end of said elongated member to enable the caddy to roll over a clear terrain; means on said framework for supporting a ski boot, said support means comprising a first member connected to said elongated member and a second member connected to one of said laterally extending members so that the ski boot can be retained between said first and second members; a snow support, means for connecting said snow support to said framework so that it lies adjacent to said wheels, said wheels and said snow support being proportioned so that said caddy is supported by said wheels in shallow snow and by said snow support in deep snow.

5. A device as defined in claim 4 wherein said first member comprises a downwardly facing lip for engaging one portion of the ski boot and said second member includes a gripping member for engaging another portion of the ski boot.

6. A device as defined in claim 5 including means for urging said second member against the ski boot.

7. A device as defined in claim 4 wherein said second member comprises legs and a boot support, said legs including an aperture through which said laterally extending member is received, said boot support includes an upwardly extending gripping member having a bearing surface facing said elongated member, and means mounted on said laterally extending member for urging said second member toward said elongated member.

8. A device as defined in claim 7 wherein said elongated member and said second member include complementary camming surfaces, said second member being rotatably mounted on said elongated member, and rotation of said second member causes said camming surfaces to move said second member away from said elongated member to release the ski boot.

9. A device as defined in claim 4 including means connected to said framework for supporting skis as they lie along said elongated member.

10. A device as defined in claim 9 wherein said elongated member comprises a plurality of interconnected elements that are movable with respect to each other so that the length of said elongated member can be increased when said caddy supports a pair of skis.

11. A caddy comprising a framework that includes an elongated member, said elongated member supporting two oppositely directed laterally extending members at one end thereof, means for rotatably mounting a wheel to each of said laterally extending members to enable said caddy to roll over a clear terrain, first means for supporting a portion of a ski boot, said first means being supported by said elongated member in spaced relation from said laterally extending members, second means mounted on at least one of said laterally extending members for engaging another portion of the ski boot, a snow support, means for connecting said snow support to said framework so that it lies adjacent to said wheels, said connecting means including means supported by said laterally extending members and comprising first locking means, said snow support comprising complementary locking means for engaging said first locking means, and said wheels and said snow support being proportioned so that said caddy is supported by said wheels in shallow snow and by said snow support in deep snow.

12. A device as defined in claim 11 including means for connecting a portion of said snow support which is remote from said complementary locking means to said elongated member.

13. A device as defined in claim 11 including means connected to said framework for supporting skis as they lie along said elongated member.

14. A device as defined in claim 13 including a cup, said cup being connected to one end of said elongated member with its opening in generally facing relation to the other end of said framework so that the heels of skis which are carried thereby are supported by said cup as they lie along said elongated member.

15. A device as defined in claim 13 wherein said elongated member comprises a plurality of interconnected elements that are movable with respect to each other so that the length of said elongated member can be increased when said caddy supports a pair of skis.

16. A caddy comprising a framework that includes an elongated member and oppositely directed, laterally extending members at one end of said elongated member, a plurality of wheels, means for rotatably mounting said wheels in spaced relation to each other on said laterally extending members to enable said caddy to roll over a clear terrain, means connected to said framework for supporting at least one ski boot, a snow support, means for connecting said snow support to said framework so that it lies adjacent to said wheels, said wheels and said snow support being proportioned so that said caddy is supported by said wheels in shallow snow and by said snow support in deep snow, and said snow support comprises a relatively thin member having a substantial width relative to its thinness, means for connecting one end of said snow support to said laterally extending members, means for connecting the other end of said snow support to said elongated member, and a plurality of runners, said runners being mounted on said snow support for guiding said caddy over snow.

* * * * *